(12) United States Patent
Menache

(10) Patent No.: US 7,068,277 B2
(45) Date of Patent: Jun. 27, 2006

(54) SYSTEM AND METHOD FOR ANIMATING A DIGITAL FACIAL MODEL

(75) Inventor: Alberto Menache, Los Angeles, CA (US)

(73) Assignees: Sony Corporation, Tokyo (JP); Sony Pictures Entertainment Inc., Culver City, CA (US)

(*) Notice: Subject to any disclaimer, the term of this patent is extended or adjusted under 35 U.S.C. 154(b) by 0 days.

(21) Appl. No.: 10/444,278

(22) Filed: May 23, 2003

(65) Prior Publication Data

US 2004/0179013 A1 Sep. 16, 2004

Related U.S. Application Data

(60) Provisional application No. 60/454,871, filed on Mar. 13, 2003.

(51) Int. Cl.
*G06T 15/70* (2006.01)
(52) U.S. Cl. ............... 345/473; 345/474; 345/660; 345/952; 345/957
(58) Field of Classification Search .......... 345/473, 345/474, 660, 952, 957
See application file for complete search history.

(56) References Cited

U.S. PATENT DOCUMENTS 6,163,322 A * 12/2000 LaChapelle ............ 345/473

2002/0041285 A1 * 4/2002 Hunter et al. ............ 345/474

FOREIGN PATENT DOCUMENTS

FR WO 02/07101 A1 * 7/2001

* cited by examiner

*Primary Examiner*—Kimbinh T. Nguyen
(74) *Attorney, Agent, or Firm*—O'Melveny & Myers LLP

(57) ABSTRACT

A system and method for animating facial motion comprises an animation processor adapted to generate three-dimensional graphical images and having a user interface and a facial performance processing system operative with the animation processor to generate a three-dimensional digital model of an actor's face and overlay a virtual muscle structure onto the digital model. The virtual muscle structure includes plural muscle vectors that each respectively define a plurality of vertices along a surface of the digital model in a direction corresponding to actual facial muscles. The facial performance processing system is responsive to an input reflecting selective actuation of at least one of the plural muscle vectors to thereby reposition corresponding ones of the plurality of vertices and re-generate the digital model in a manner that simulates facial motion. The muscle vectors further include an origin point defining a rigid connection of the muscle vector with an underlying structure corresponding to actual cranial tissue, an insertion point defining a connection of the muscle vector with an overlying surface corresponding to actual skin, and interconnection points with other ones of the plural muscle vectors.

23 Claims, 6 Drawing Sheets

SYSTEM AND METHOD FOR ANIMATING A DIGITAL FACIAL MODEL

CROSS-REFERENCE TO RELATED APPLICATION

This application claims priority pursuant to 35 U.S.C. § 119(e) to U.S. provisional patent application Ser. No. 60/454,871, filed Mar. 13, 2003, entitled "Performance Facial System."

BACKGROUND OF THE INVENTION

1. Field of the Invention

The present invention relates to three-dimensional graphics and animation, and more particularly, to a system and method for animating a digital facial model based on biomechanical constraints derived from human anatomy.

2. Description of Related Art

Computer graphics (CG) animation is often used in the production of motion pictures and video games to create digital representations of a character's face. In a typical CG animation system, computer software tools are used to create and render virtual objects. The objects may be modified to produce a series of individual frames that are successively displayed in the form of a movie or video file, thereby giving the object the appearance of motion. In the process of creating a CG animation involving a transition of an object from one form to another, a graphics artist will not ordinarily modify the object for every frame. Instead, using a process known as keyframing, the graphics artist creates only the important frames (i.e., keyframes) during which an object changes its size, direction, shape or other properties, and the computer software generates the intermediate frames that form the transition by interpolating between the selected keyframes. The keyframing technique is advantageous in that it significantly reduces the time needed to produce a CG animation.

A drawback of the keyframing technique is that the intermediate frames often appear distorted. These distortions are generally less noticeable when the animated character is non-human (e.g., a robot or cartoon character) in which the audience does not have a preconceived notion as to how the object should appear or move. But, when the animated character is intended to represent a human, the audience will often recognize the distortion of the intermediate frames as not appearing natural. This is particularly noticeable when keyframing is used to animate transitions of a character's face, such as from one facial expression to another (e.g., from a smile to a frown). Because human facial expressions are so familiar, the audience will usually notice and be distracted by slight defects of the animation. Since it is an objective of computer graphics animation to produce realistically appearing visual effects, it is desirable to minimize the distortion of intermediate frames.

Another computer graphics technique is known as motion capture, in which the movement of a real object is mapped onto a computer generated object. In a motion capture system, an actor wears a suit having markers attached at various locations (e.g., small reflective markers attached to the body and limbs) and digital cameras record the movement of the actor from different angles while illuminating the markers. The system then analyzes the images to determine the locations (e.g., as spatial coordinates) and orientation of the markers on the actor's suit in each frame. By tracking the locations of the markers, the system creates a spatial representation of the markers over time and builds a digital representation of the actor in motion. The motion is then applied to a digital representation, which may then be textured and rendered to produce a complete CG representation of the actor and/or performance. This technique has been used by special effects companies to produce incredibly realistic animations in many popular movies.

Motion capture systems are also used to track the motion of facial features of an actor to create a representation of the actor's facial motion and expression (e.g., laughing, crying, smiling, etc.). As with body motion capture, markers are attached to the actor's face and cameras record the actor's expressions. Since facial movement involves relatively small muscles in comparison to the larger muscles involved in body movement, the facial markers are typically much smaller than the corresponding body markers, and the cameras typically have higher resolution than cameras usually used for body motion capture. The cameras are typically aligned in a common plane with physical movement of the actor restricted to keep the cameras focused on the actor's face. The facial motion capture system may be incorporated into a helmet or other implement that is physically attached to the actor so as to uniformly illuminate the facial markers and minimize the degree of relative movement between the camera and face. For this reason, facial motion and body motion are usually captured in separate steps. The captured facial motion data is then combined with captured body motion data later as part of the subsequent animation process.

An advantage of motion capture systems over traditional animation techniques, such as keyframing, is the capability of real-time visualization. The production team can review the spatial representation of the actor's motion in real-time or near real-time, enabling the actor to alter the physical performance in order to capture optimal data. Moreover, motion capture systems detect subtle nuances of physical movement that cannot be easily reproduced using other animation techniques, thereby yielding data that more accurately reflects natural movement. As a result, animation created using source material that was collected using a motion capture system will exhibit a more lifelike appearance.

Notwithstanding these advantages of motion capture systems, the separate capture of facial and body motion often results in animation data that is not truly lifelike. Facial motion and body motion are inextricably linked, such that a facial expression is often enhanced by corresponding body motion. For example, an actor may utilize certain body motion (i.e., body language) to communicate emotions and emphasize corresponding facial expressions, such as using arm waving when talking excitedly or shoulder shrugging when frowning. This linkage between facial motion and body motion is lost when the motions are captured separately, and it is difficult to synchronize these separately captured motions together. When the facial motion and body motion are combined, the resulting animation will often appear noticeably abnormal. Thus, the decoupling of facial and body motion represents a significant deficiency of conventional motion capture systems.

Accordingly, it would be desirable to provide a computer graphics animation system that overcomes these and other drawbacks of the prior art. More specifically, it would be desirable to provide a computer graphics animation system that enables highly realistic animation of a digital facial model.

SUMMARY OF THE INVENTION

In accordance with the teachings of the present invention, a system and method is provided for animating a digital facial model based on biomechanical constraints derived from human anatomy. The resulting animation is highly realistic and lifelike.

More particularly, a system for animating facial motion comprises an animation processor adapted to generate three-dimensional graphical images and a facial performance processing system operative with the animation processor to generate a three-dimensional digital model of an actor's face and overlay a virtual muscle structure onto the digital model. The virtual muscle structure includes plural muscle vectors that each respectively define a plurality of vertices along a surface of the digital model in a direction corresponding to that of actual facial muscles. The facial performance processing system is responsive to an input reflecting selective actuation of at least one of the plural muscle vectors to thereby reposition corresponding ones of the plurality of vertices and re-generate the digital model in a manner that simulates facial motion. The muscle vectors further include an origin point defining a rigid connection of the muscle vector with an underlying structure corresponding to actual cranial tissue, an insertion point defining a connection of the muscle vector with an overlying surface corresponding to actual skin, and interconnection points with other ones of the plural muscle vectors.

The input reflecting selective actuation of at least one of the plural muscles may take several forms. In one exemplary approach, the input further comprises a user selection of at least one of the plural muscle vectors and a compression value to be applied to the selected one of the plural muscle vectors. This approach enables a user to actuate a single muscle vector and observe the effect of that actuation on the facial model. In another exemplary approach, the input further comprises a user selection of a pose comprising a combination of plural ones of the plural muscle vectors and at least one associated compression value to be applied to the plural muscle vectors. This approach enables a user to control groups of muscles to form expressions, such as happy, sad, worried, thoughtful, angry, and others. In yet another exemplary approach, the facial performance processing system communicates with a motion capture processor to receive motion capture data reflecting facial motion of an actor. The motion capture data thereby directly controls the actuation of muscle vectors of the facial model. The motion capture data may also be re-targeted for a different digital model. This enables motion capture data for an adult actor to be retargeted to control the actuation of muscle vectors for a facial model of a child.

In another embodiment of the invention, the facial performance processing system is further operative to define facial marker locations corresponding to the plurality of vertices. Moreover, the facial performance processing system is further operative to generate a template having holes corresponding to the defined facial marker locations for use in marking the locations onto the actor's face.

A more complete understanding of the system and method for animating a digital facial model will be afforded to those skilled in the art, as well as a realization of additional advantages and objects thereof, by a consideration of the following detailed description of the preferred embodiment. Reference will be made to the appended sheets of drawings, which will first be described briefly.

DETAILED DESCRIPTION OF THE PREFERRED EMBODIMENT

As will be further described below, the present invention satisfies the need for a computer graphics animation system that enables highly realistic animation of a digital facial model. In the detailed description that follows, like element numerals are used to describe like elements illustrated in one or more of the drawings.

Figure 1:
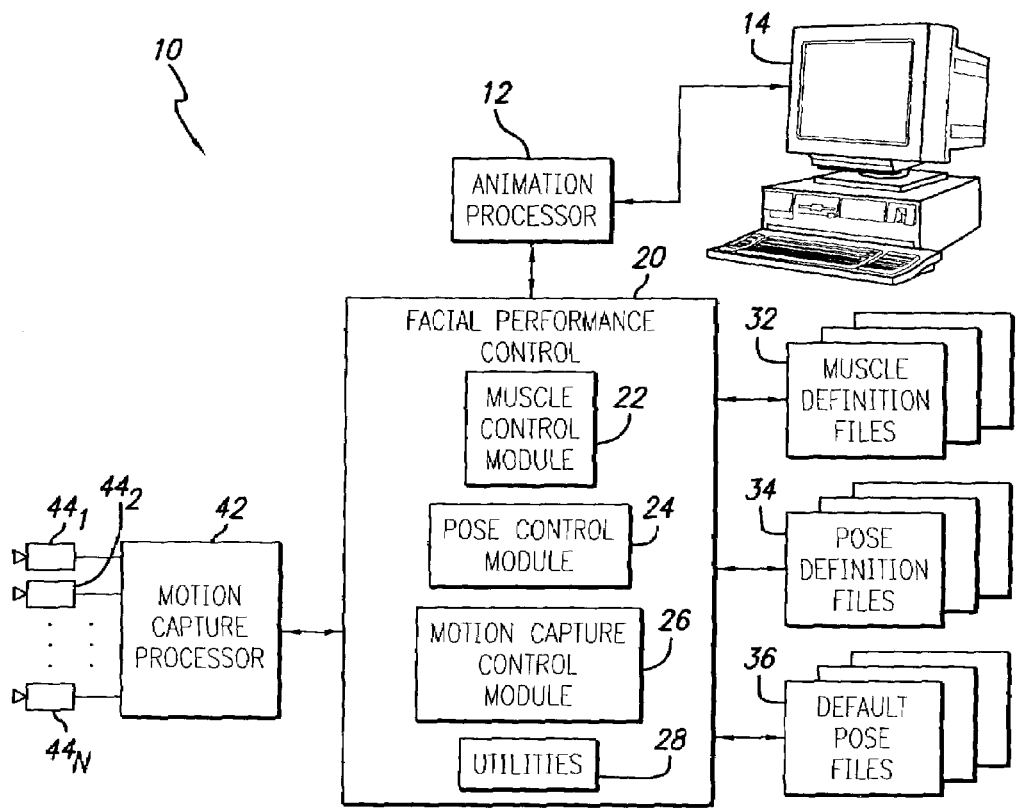
FIG. 1 is a block diagram illustrating an exemplary animation system including a facial motion performance control system in accordance with an embodiment of the present invention.

Referring first to FIG. 1, a block diagram illustrates an exemplary animation system 10 including a facial motion performance control system 20 in accordance with an embodiment of the present invention. The animation system 10 includes an animation processor 12 coupled to a computer workstation 14 that enables a graphic artist to create a computer graphics animation. The animation processor 12 may further comprise a programmable computer executing a commercial software package that enables the creation of 3 D graphics and animation for the entertainment industry, such as the Maya® software product line sold by Alias|Wavefront™ or other like products. The animation system 10 further includes a facial performance control system 20 that works with the animation processor 12 to provide enhanced facial animation, as will be further described below. It should be understood that the facial performance control system 20 may comprise an entirely separate computer hardware and software system from the animation processor 12, or alternatively, may be incorporated with the animation processor 12 (e.g., as a "plug-in") as part of a common hardware and software system.

The facial performance control system 20 mimics the way in which a human facial muscle structure forms facial expressions. More particularly, each muscle of an actual human face is modeled in a manner to reflect the physical effect of muscle compression as well as its influence on other interconnected muscles. For example, when a first muscle moves in a certain way, one or more other muscles are caused to move or have their movement influenced by the movement of the first muscle. In addition, the skin overlying the muscles is also modeled so that the skin moves as the underlying muscles are moved. The interrelationship of constraints among the muscles and skin are based on biomechanical models derived from human anatomy.

The facial performance control system 20 is further organized into a plurality of software modules adapted to provide distinct functionality, including a muscle control module 22, a pose control module 24, a motion capture control module 26, and a utilities module 28. The muscle control module 22 enables a graphic artist to manipulate an individual muscle of the digital model in order to change the facial expression. The facial performance control system 20 creates and utilizes a plurality data files in the operation of the various software modules, including muscle definition files 32, pose definition files 34, and default pose files 36. The muscle definition files 32 each define certain parameters that determine the particular operation of an individual muscle group of the face. The pose definition files 34 each define parameters of groups of muscles that interact together to define certain poses, such as happy, sad, etc. The default pose files 36 each define the physical arrangement of markers on a particular actor's face in a predefined or default pose. The data files would be stored in a persistent or non-volatile memory, as is commonly understood in the art. Each of these software modules and definition files will be further described in greater detail below.

The animation system 10 further includes a motion capture processor 42 that communicates with the facial performance control system 20. The motion capture processor communicates with a plurality of motion capture cameras $44_1$–$44_N$. The motion capture processor 42 may further comprise a programmable computer. The motion capture cameras $44_1$–$44_N$ are arranged with respect to a motion capture volume to capture the facial motion of one or more actors performing within the motion capture volume. Each actor's face and body is marked with markers that are detected by the motion capture cameras $44_1$–$44_N$ during the actor's performance within the motion capture volume. The markers may be reflective or illuminated elements. Specifically, each actor's body may be marked with a plurality of reflective markers disposed at various body locations including head, legs, arms, and torso. The actor may be wearing a body suit formed of non-reflective material to which the markers are attached. The actor's face will also be marked with a plurality of markers. The facial markers are generally smaller than the body markers and a larger number of facial markers are used than body markers. To capture facial motion with sufficient resolution, it is anticipated that a high number of facial markers be utilized (e.g., more than 100). In one exemplary implementation, 152 small facial markers and 64 larger body markers are affixed to the actor. The body markers may have a width or diameter in the range of 5 to 9 millimeters, while the face markers may have a width or diameter in the range of 1 to 3 millimeters.

The motion capture processor 42 processes two-dimensional images received from the motion capture cameras $44_1$–$44_N$ to produce a three-dimensional digital representation of the captured motion. Particularly, the motion capture processor 42 receives the two-dimensional data from each camera and saves the data in the form of multiple data files. The two-dimensional data files are then resolved into a single set of three-dimensional coordinates that are linked together in the form of trajectory files representing movement of individual markers. The images from one or more cameras are used to determine the location of each marker. For example, a marker may only be visible to a subset of the cameras due to occlusion by facial features or body parts of actors within the motion capture volume. In that case, the motion capture processor 42 uses images from other cameras that have an unobstructed view of that marker to determine the marker's location in space. The motion capture processor 42 may utilize commercial software packages to perform these and other data processing functions, such as available from Vicon Motion Systems™ or Motion Analysis Corp.™

Figure 2:
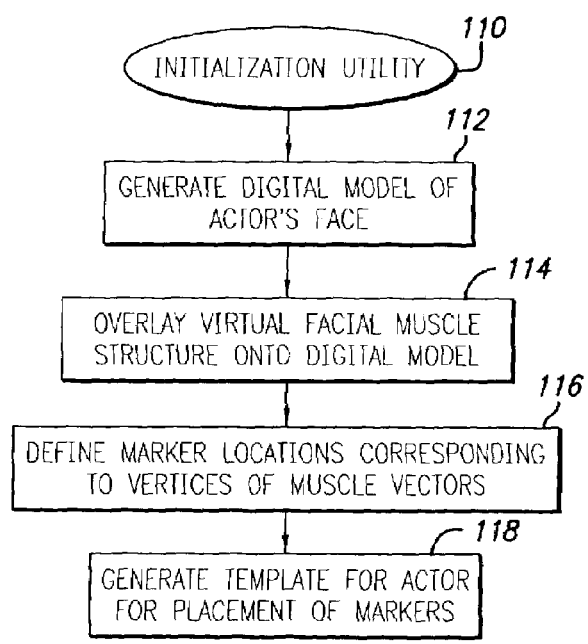
FIG. 2 is a flow diagram reflecting an initialization utility executed by the facial motion performance control system.
Figure 3:
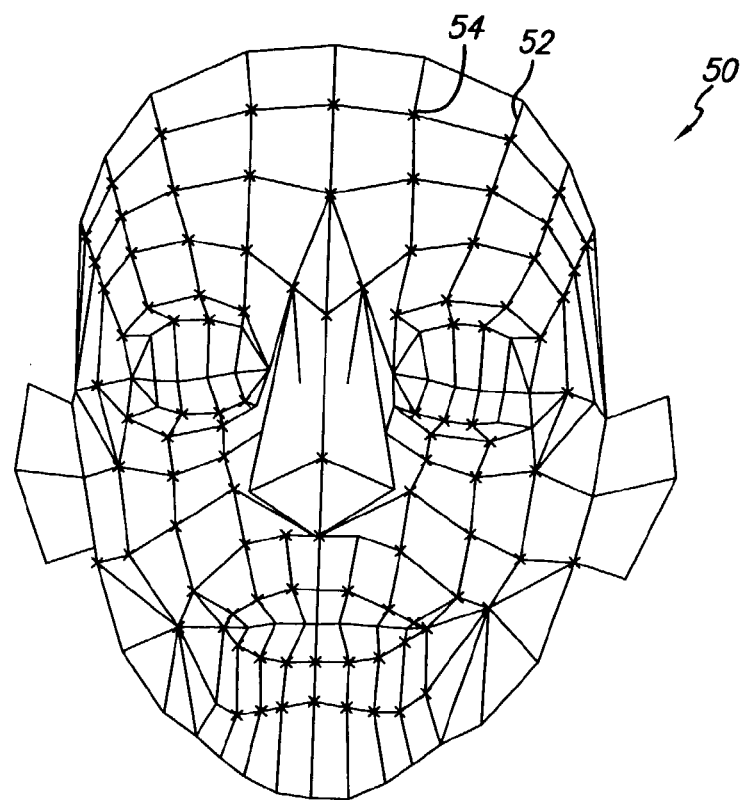
FIG. 3 is a graphical illustration of a facial model including designated motion capture marker locations corresponding to facial musculature structure.

Referring now to FIG. 2, an initialization utility 110 of the facial performance control system 10 is shown. The initialization utility 110 is used to initialize the system for modeling the face of a particular actor. In step 112, a digital model is formed of the actor's face. The digital model may be based on a plurality of digital photographs taken of the actor from various angles that are assembled together to produce a three-dimensional (3 D) image file or digital model. Software tools to produce a 3 D image file are well known in the art, as discussed above. An example of a digital model is shown in FIG. 3, in which a 3 D facial structure 50 is generated from a plurality of spline surfaces that each define a portion of the surface of the facial structure. The spline surfaces are formed from individual line segments 52 that are collectively referred to as a "wire frame." The facial structure 50 represents a sub-facie structure, also referred to as a "mug", that lies below the skin surface. An outer surface tissue having desired texture and color will be applied to this mug as part of a subsequent animation process to produce an animated character. It should be understood that the shape of the facial structure 50 will control the facial expressions formed by the animated character.

Once the digital model is created, a virtual facial muscle structure is overlaid onto the digital model of the facial structure 50 at step 114. The human facial muscle structure is well understood in the medical literature, and the position and interconnection of the individual muscles can be readily mapped onto the digital model. The muscles that form facial expression comprise subcutaneous voluntary muscles that have respective points of origin at the bones or facia of the cranium and points of insertion into the skin. Some muscles are coupled to other muscles. As such, each muscle can be defined in terms of a curve having a plurality of vertices with an origin point (i.e., location of connection to the bones or facia) and an insertion point (i.e., location of connection to the skin). These parameters are stored in the form of the muscle definition files 32.

As known in the medical art, the upper facial muscles are responsible for changing the appearance of the eyebrows, forehead, and upper and lower eyelids. The Frontalis muscles in the upper portion of the face contract isotonically towards static insertion points on the cranium, enabling the surface tissue (i.e., skin) to bunch and wrinkle perpendicularly to the direction of the muscle. The lower facial muscles are made up of several distinct groups, including the Zygomaticus major muscles that contract in an angular direction from the lips toward the cheekbones, the Orbicularis Oculi muscles that are circular or elliptical in nature and extend around the eyes, the Obicularis Oris muscles that extend around the mouth, the Buccinator muscles that contract horizontally toward the ears, and others controlling various miscellaneous actions. The muscles of the mouth have particularly complex muscular interaction. The Obicularis Oris is a sphincter muscle with no attachment to bone. Three primary muscles, i.e., M. Levator, Labii Superioris and Alaeque Nasi, join from above, while the M. Buccinator joins at the major node of the mouth and contracts horizontally. The M. Depressor, Anguli Oris, M. Depressor Labii Inferioris and Mentalis each contract obliquely and vertically. Facial expressions are formed by complex and combined movements of these upper and lower facial muscles.

Figure 4:
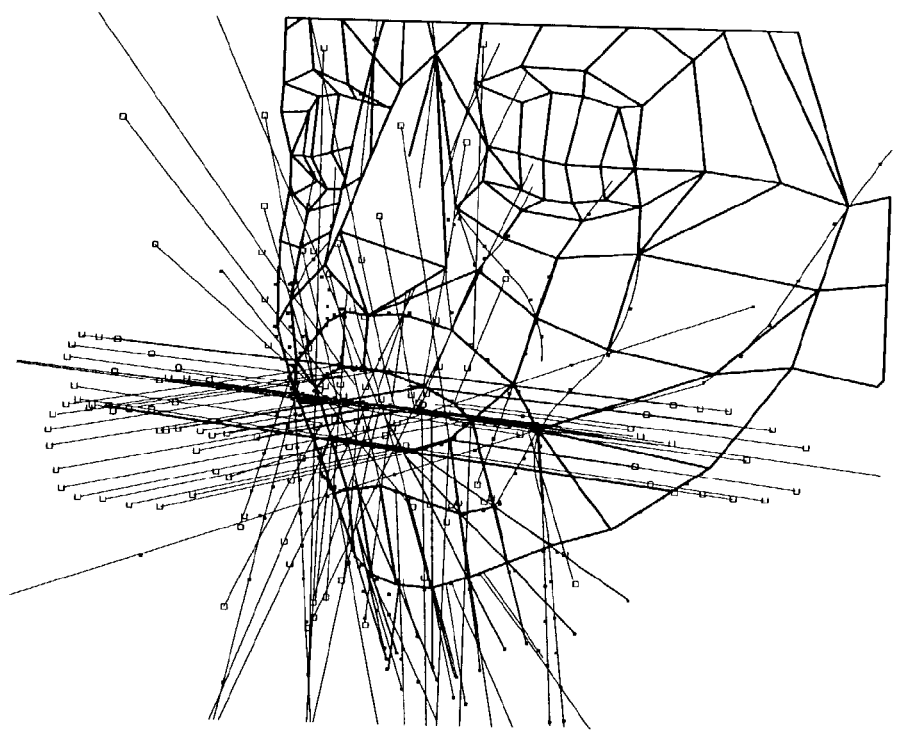
FIG. 4 is a graphical illustration of a facial model including certain muscle vectors corresponding to mouth and jaw motion.
Figure 5:
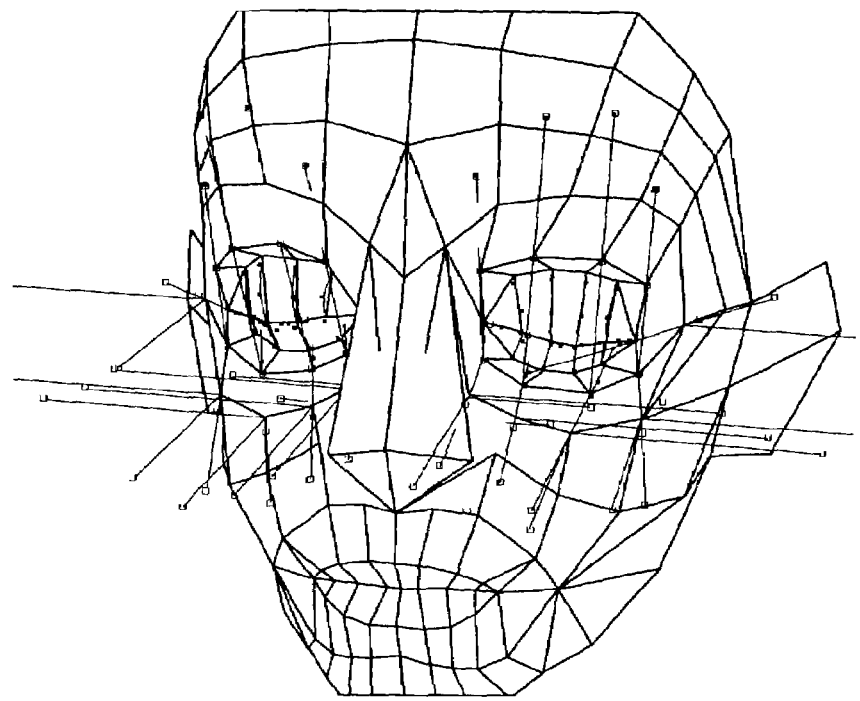
FIG. 5 is a graphical illustration of a facial model including certain muscle vectors corresponding to eye motion.

FIGS. 4 and 5 illustrate a partial mapping of the virtual facial muscles onto the digital model of the facial structure 50. FIG. 4 is a graphical illustration of a facial structure 50 including certain muscle vectors corresponding to jaw motion, and FIG. 5 is a graphical illustration of a facial structure 50 including certain muscle vectors corresponding to eye motion. The muscle vectors are shown as curves that follow the topology of individual facial muscles and intersect with the line segments 52 that form the wire frame. Each curve has an insertion point and origination point, as well as a plurality of vertices along the length of the curve coincident with the surface of the facial model. The muscle vectors are described in corresponding muscle definition files 32. As will be further described below, muscle actuation is achieved in the digital model by compressing a selected muscle vector or group of muscle vectors to accomplish repositioning of the corresponding plurality of vertices and thereby reshape the surface of the digital model. Since the insertion points of the muscle vectors into the skin are defined in the muscle definition 32, the effect of muscle actuation on the skin is also understood and can be animated accordingly.

Returning to step 116 of FIG. 2, after the facial muscles are mapped onto the digital model, a plurality of marker locations are designated that correspond generally to the vertices of the muscle vectors. These marker locations are illustrated in FIG. 3 as the plurality of +symbols (see also FIG. 11). Then, in step 118, the initialization utility generates a template that is used to place the physical markers onto the marker locations defined in step 117. The template may be used to produce a corresponding three-dimensional mask, such as formed out of plastic or other material. This mask may be formed to fit the actor's face with holes drilled at the designated marker locations. The hole locations may then be used to mark directly onto the actor's face using a suitable pen. Thereafter, the facial markers can be applied directly to the actor's face at the marked locations. The facial markers may be affixed to the actor's face using suitable materials known in the theatrical field, such as make-up glue. This way, a motion capture production that extends over a lengthy period of time (e.g., months) can obtain reasonably consistent motion data for an actor even though the markers are applied and removed each day.

Figure 6:
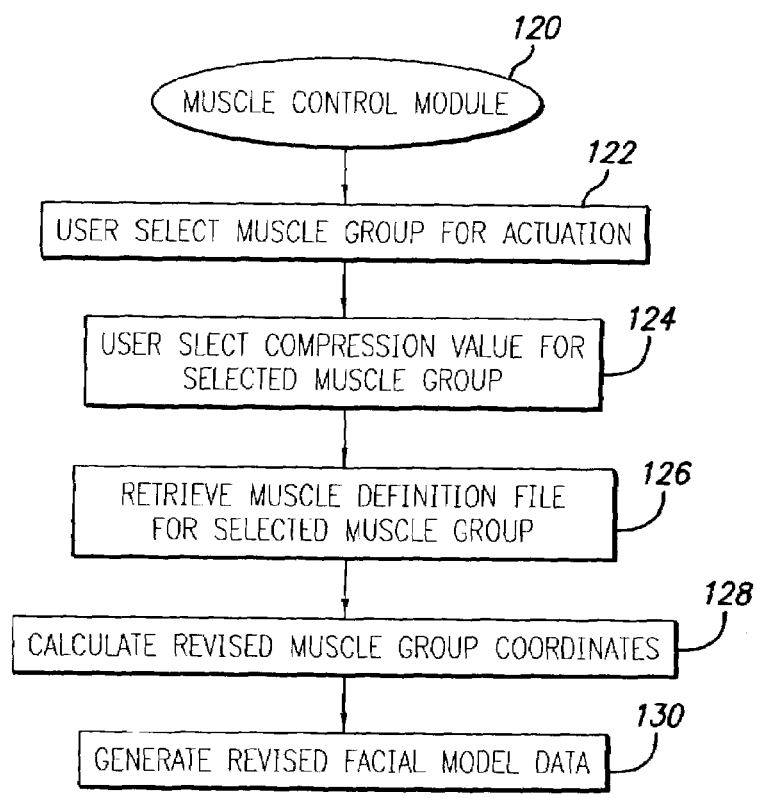
FIG. 6 is a flow diagram reflecting a muscle control module executed by the facial motion performance control system.

Referring now to FIG. 6, a flow diagram reflecting a muscle control module 120 executed by the facial motion performance control system 20 is shown. At step 122, a user selects a muscle group for actuation. For example, a graphical user interface may provide a toolbar or menu that enables a user to select a particular muscle group from among a plurality of choices. At step 124, once the muscle group is selected, a user selects a compression value to apply to the selected muscle group. The compression value determines the amount of compression to be applied to the selected muscle group. For example, the graphical user interface may provide a slide bar or like tool that can be moved on the computer screen using a pointing device, e.g., mouse. Alternatively, the user may enter a number corresponding to the desired compression value into an appropriate field. Or, in another embodiment, the user may click on and drag the muscle vector, thereby performing the muscle group selection and compression value selection in a single step.

The muscle control module 120 then retrieves from memory the muscle definition file 32 for the selected muscle group at step 126. As described above, the muscle definition file 32 defines the parameters for the selected muscle group, including the points of origination and insertion, the coordinates of the muscle vector and associated vertices (e.g., expressed in terms of Cartesian coordinates), and interactions with other muscle groups. Then, at step 128, the muscle control module 120 re-calculates the coordinates of the selected muscle group and other affected muscle groups based on the selected compression value and other parameters defined in the muscle definition file 32. Lastly, at step 130, the muscle control module 120 regenerates the facial structure 50 reflecting the re-calculated coordinates. It should be appreciated that these steps may appear to the user as being performed in real time, so that the user can observe on the screen physical changes to the facial structure 50 in response to variations of the compression value. A user may experiment by selecting various muscle groups and applying differing compression values until a desired facial expression is achieved.

Figure 7:
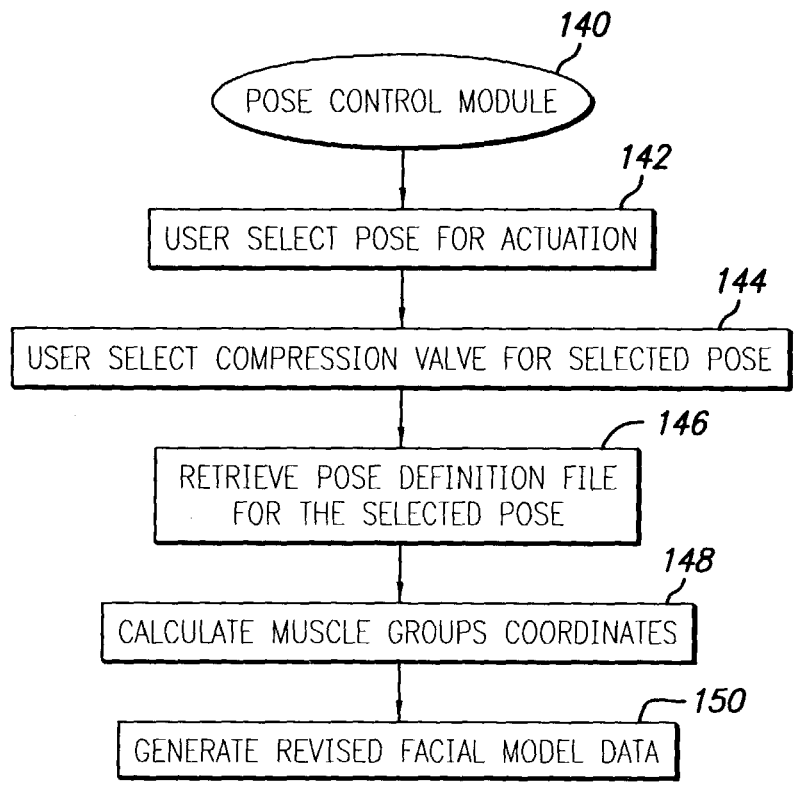
FIG. 7 is a flow diagram reflecting a pose control module executed by the facial motion performance control system.

FIG. 7 shows a flow diagram reflecting a pose control module 140 executed by the facial motion performance control system 20. At step 142, a user selects a pose for actuation. A pose comprises a facial expression formed by a complex interaction of several muscle groups, such as a happy, sad, pensive, thoughtful, angry or frightened expression. Each of these expressions involve a plurality of individual muscle groups. For example, a happy expression involves the lower face muscles in lifting corners of the upper lip to form a smile, but may also involve the upper face muscles in wrinkling the brow and/or squinting the eyes. As described above, a graphical user interface may provide a toolbar or menu that enables a user to select a particular pose from among a plurality of choices. Once the pose is selected, at step 144, a user selects a compression value to apply to the selected pose. The compression value determines the amount of compression to be applied to each of the muscle groups that comprise the pose. It should be appreciated that a uniform compression value may not be applied to each muscle group. Instead, the compression value applied to individual muscle groups may vary substantially across the compression range of the pose. For example, at one end of the compression range for a happy pose (e.g., mildly happy), only the cheek muscles may be compressed, while at the other end of the range (e.g., extremely happy), many muscle groups may be compressed.

The pose control module 120 then retrieves from memory the pose definition file 34 for the selected pose at step 146. As described above, the pose definition file 34 defines the parameters for the poses, including an identification of the muscle groups and range of compression values for each muscle group. Then, at step 148, the pose control module 140 re-calculates the coordinates of each of the muscle groups of the pose based on the selected compression value and other parameters defined in the pose definition file 34. Lastly, at step 150, the pose control module 140 regenerates the facial structure 50 reflecting the re-calculated coordinates. As with the muscle control module 120, these steps may appear to the user as being performed in real time, so that the user can observe on the screen physical changes to the facial structure 50 in response to variations of the compression value. Moreover, a user may control the compression values to achieve a smooth transition from one pose (e.g., sad) to another (e.g., happy). It should be appreciated that this approach results in intermediate expressions that are natural and realistic.

Figure 8:
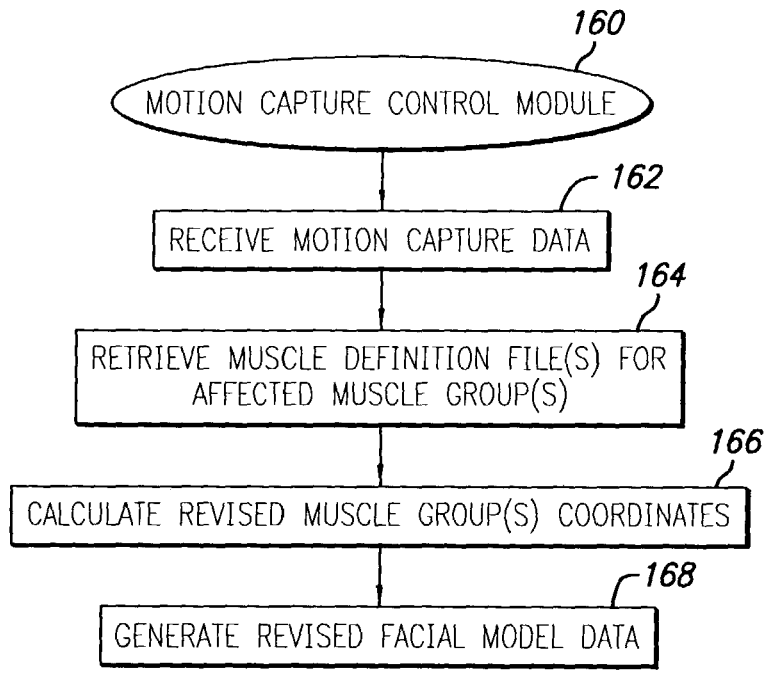
FIG. 8 is a flow diagram reflecting a motion capture control module executed by the facial motion performance control system.

FIG. 8 shows a flow diagram reflecting a motion capture control module 160 executed by the facial motion performance control system 20. In this aspect of the present invention, the motion capture processor 42 can be used as an input device to control operation of the facial performance control system 20. At step 162, the motion capture control module 160 receives motion capture data from the motion capture processor 42. As discussed above, the motion capture processor 42 is adapted to capture facial motion data reflecting an actor's performance within a motion capture volume. The facial motion data will include relative physical movements of the facial markers that correspond to vertices of the predefined muscle vectors. These captured physical movements are used to calculate a corresponding compression value being applied to the respective muscle vectors. At step 164, the motion capture control module 160 then retrieves from memory the muscle definition file(s) 32 for the muscle group(s) corresponding to the vertices having experienced movement. Then, at step 166, the motion capture control module 160 re-calculates the coordinates of the selected muscle group(s) and other affected muscle groups based on the calculated compression value and other parameters defined in the muscle definition file(s) 32. In this process, the previously existing muscle animation values are added to the ones calculated from the motion capture data. Lastly, at step 168, the motion capture control module 160 regenerates the facial structure 50 reflecting the re-calculated coordinates. It should be appreciated that these steps may appear to the user as being performed in real time, so that the user can observe on the screen physical changes to the facial structure 50 in response to the actor's performance within the motion capture volume.

Figure 9:
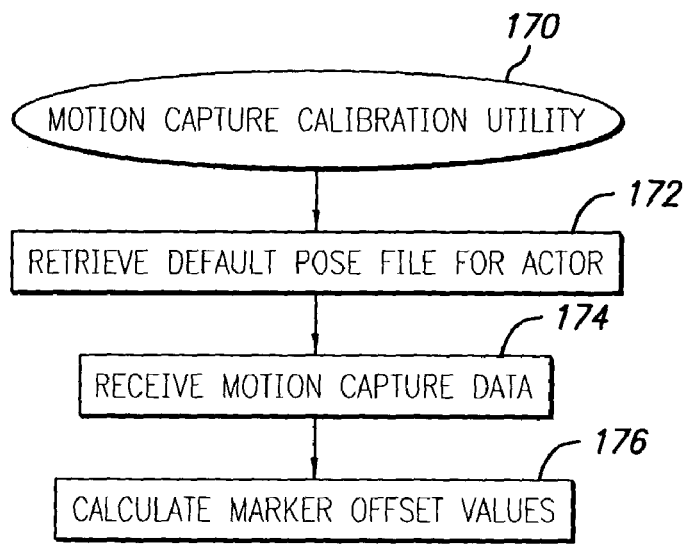
FIG. 9 is a flow diagram reflecting a motion capture calibration utility executed by the facial motion performance control system.

Before the motion capture control module 160 can be utilized to control the animation of the facial structure 50, it may be necessary to calibrate the motion capture data. FIG. 9 is a flow diagram reflecting a motion capture calibration utility 170 executed by the facial motion performance control system 20. At step 172, the motion capture calibration utility 170 retrieves the default pose file 36 for a selected actor. The default pose is a baseline expression that the actor makes within the motion capture volume. In the default pose, the actor may stand motionless in the motion capture volume with eyes closed and a blank facial expression so that an image file is created for the actor using the motion capture processor 42. The default pose file 36 for the actor is created the first time that the actor performs the default pose. The actor will then repeat the default pose on a periodic basis, such as once each time the facial markers are applied, so that the current image file can be compared to the default pose file 36. It should be understood that a unique default pose file 36 is created for each actor.

During a subsequent performance of the default pose, the motion capture calibration utility 170 receives the motion capture data in step 174. This motion capture data is then compared to the default pose file 36 for the actor. It should be understood that there may be inconsistencies in the location of the facial markers from day to day, such as due to different personnel being used to apply the facial markers, movement of the actor during application of the facial markers, and other factors. These inconsistencies can be accurately quantified through this comparison to the default pose file 36. In step 176, a set of marker offset values are determined based on the comparison. The offset values may comprise vectors showing the relationship between the current marker locations and the locations defined in the default pose file 36, in terms of direction and/or distance. Alternative measurement systems for calculating the offset values may also be advantageously utilized. The offset values may then be used in the subsequent processing of motion capture data for the actor, such as in the operation of the motion capture control module 160 discussed above. This ensures that the motion capture data acquired for an actor at different times is consistent.

In an embodiment of the invention, the motion capture data for a particular actor may be used to animate a character having substantially different facial features. For example, an adult actor may be used to produce source data to animate a child character. This is advantageous because an adult actor may have greater acting skill and ability than a child actor, and there may be certain roles that would be very difficult or impossible to have a child actor perform. In another example, an actor may be used to produce source data to animate a non-human character, such as a dog or a robot. The conversion of source data to control animation of a different facial model is referred to as "re-targeting."

Figure 10:
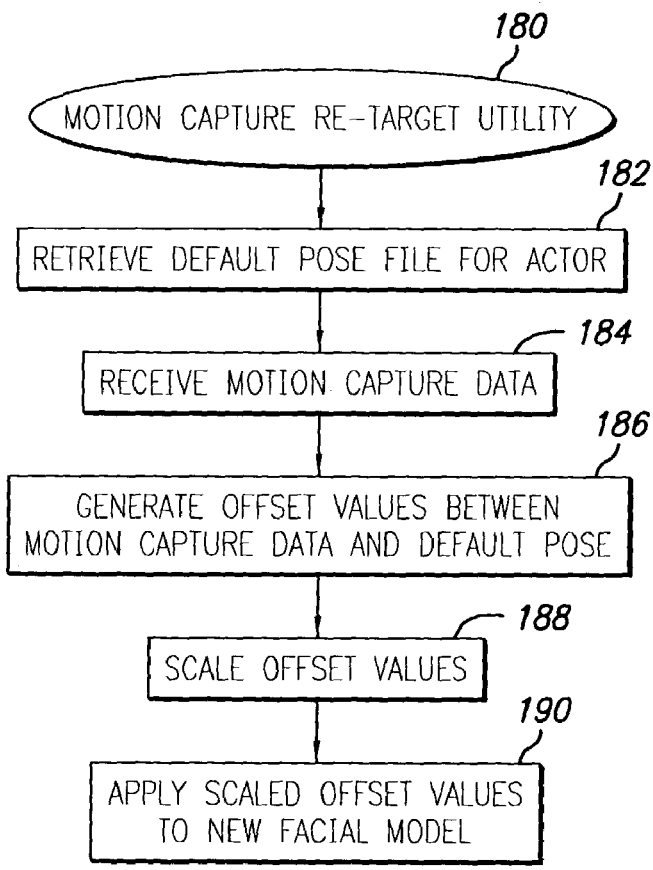
FIG. 10 is a flow diagram reflecting a motion capture re-target utility executed by the facial motion performance control system.
Figure 11:
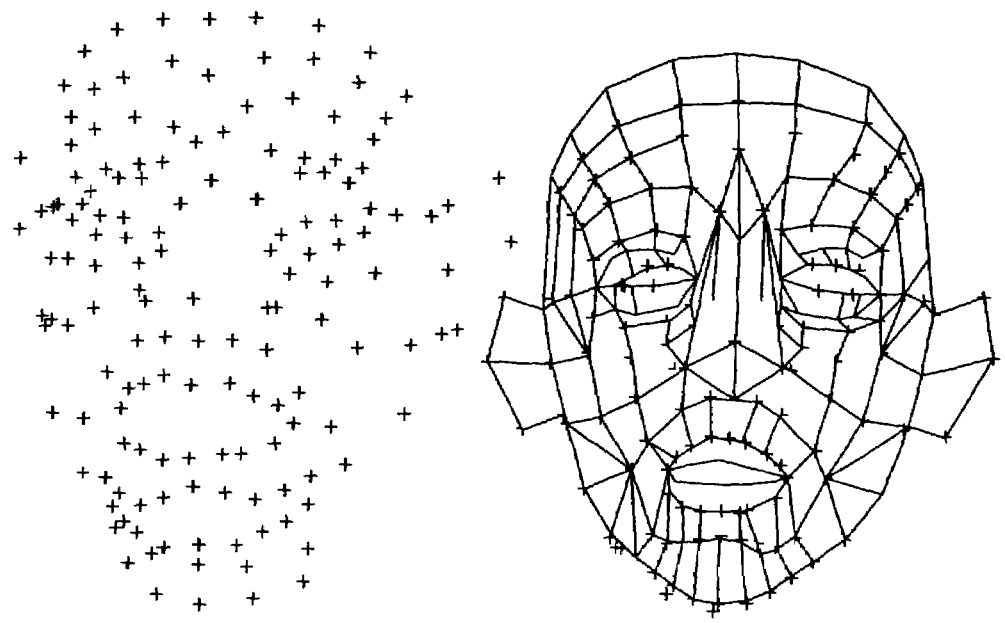
FIG. 11 is a graphical illustration of motion capture data being retargeted to a new facial model.

FIG. 10 is a flow diagram reflecting a motion capture re-target utility 180 executed by the facial motion performance control system 20. At step 182, the motion capture retarget utility 180 retrieves the default pose file 36 for a selected actor. During a performance of a scene that is desired to be re-targeted, the motion capture re-target utility 180 receives the motion capture data in step 184. This motion capture data is then compared to the default pose file 36 for the actor in a manner similar to that described above with respect to FIG. 9. In step 186, offset values for each of the marker locations are determined based on the comparison, and in step 188, the offset values are scaled using a predetermined scaling factor. Then, in step 190, the scaled offset values are used to generate the new facial model. FIG. 11 illustrates motion capture data (left) being retargeted to a new facial model (right).

A variety of methods may be employed to determine the scaling factor. In one such method, a uniform scaling factor is selected for all marker locations and all offset values are changed by that uniform amount. The uniform scaling factor may be a predetermined number that is selected using any arbitrary criteria. To improve the quality of the uniform scaling factor, it may be based on a physical measurement. For example, if adult actor motion capture data is being re-targeted for a child character, a comparison may be made between a physical feature of the adult and a child. The length of the mouth provides an acceptable physical feature for comparison purposes, in which the scaling factor corresponds to the proportional difference between the adult mouth and child mouth lengths. This method has the advantage of simplicity, but the resulting scaled offset values may not necessary yield desirable results. For example, a child's face is not necessarily proportional in all respects to that of an adult; instead, some portions of the face grow larger than other portions of the face. Thus, to further improve the quality of the scaling factor, comparisons may made using plural physical features. For example, the scaling factor for the upper portion of the face may be based on a comparison of eye lengths between adult and child, the scaling factor for the central portion of the face may be based on a comparison of nose lengths, and/or the scaling factor for the lower portion of the face may be based on a comparison of mouth lengths. It should be appreciated that a greater number of scaling factors may be advantageously utilized.

Figure 12:
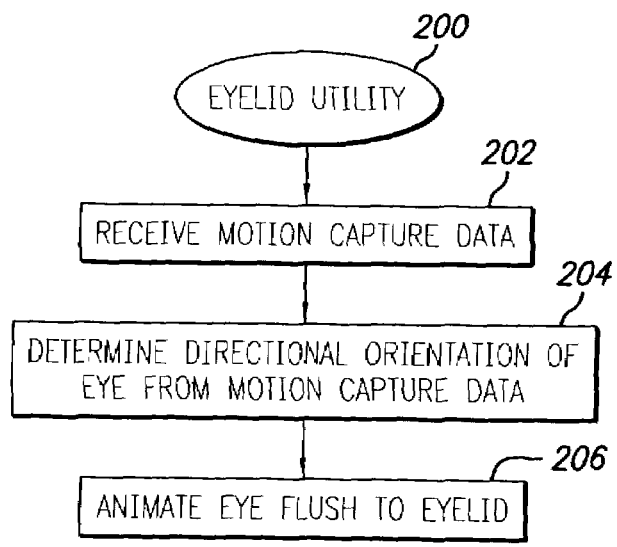
FIG. 12 is a flow diagram reflecting an eyelid motion utility executed by the facial motion performance control system.

In another embodiment of the invention, the facial model is animated to include the characters eyes. It should be appreciated that markers cannot be affixed to the actors' eyes, and so motion of the eyes cannot be captured and must therefore be animated. Nevertheless, there is sufficient information in the motion capture data to get an indication of eye movement that can be used to accurately animate the eye movement. FIG. 12 illustrates an eyelid utility 200 used to animate eye movement. In step 202, the eyelid utility 200 receives motion capture data from the motion capture processor 42. The marker set affixed to the actor's face includes certain markers affixed to the eyelids. The motion capture data therefore includes motion data of the eyelids. In step 204, the motion capture data is analyzed to determine the directional orientation of the eyes. Since the eyelids remain in contact with the surface of the eyeballs, the orientation of the eyes can be detected by monitoring movement of the eyelids. For example, when the eyes are looking downward, the eyelids move downward slightly. Conversely, when the eyes are looking upward, the eyelids move upward slightly. A more refined approach is to consider the shape of the eyeballs themselves. While a simplistic eyeball model is round, a more accurate eyeball model would include a bulge corresponding to the iris. The movement of this iris bulge can be detected from the motion capture data by causing a portion of the eyelids to protrude slightly. This protrusion can be used to animate the orientation of the eyes. Once the directional orientation of the eyes is determined, at step 206, the eyes are animated onto the facial model with the eyelids lying flush on the surface of the eyes.

While the preceding description referred to the use of optical sensing of physical markers affixed to the body and face to track motion, it should be appreciated to those skilled in the art that alternative ways to track motion could also be advantageously utilized. For example, instead of affixing markers, physical features of the actors (e.g., shapes of nose or eyes) could be used as natural markers to track motion. Such a feature-based motion capture system would eliminate the task of affixing markers to the actors prior to each performance. In addition, alternative media other than optical could be used to detect corresponding markers. For example, the markers could comprise ultrasonic or electromagnetic emitters that are detected by corresponding receivers arranged around the motion capture volume. In this regard, it should be appreciated that the cameras described above are merely optical sensors and that other types of sensors could also be advantageously utilized.

Having thus described a preferred embodiment of a system and method for animating a digital facial motion, it should be apparent to those skilled in the art that certain advantages of the invention have been achieved. It should also be appreciated that various modifications, adaptations, and alternative embodiments thereof may be made within the scope and spirit of the present invention. The invention is further defined by the following claims.

What is claimed is:

1. A method for animating facial motion, comprising:
   generating a three-dimensional digital model of an animated face;
   defining a virtual muscle structure for the digital model, said virtual muscle structure including plural muscle vectors each respectively defining a plurality of vertices lying along a surface of said digital model in a direction corresponding to that of actual facial muscles;
   receiving motion capture data reflecting physical movement of an actor's face; and
   re-generating said digital model in direct response to said motion capture data to produce an actuation of at least one of said plural muscle vectors that repositions corresponding ones of said plurality of vertices and thereby simulates motion of said digital model that corresponds to said physical movement of the actor's face.

2. The method for animating facial motion of claim 1, wherein at least one of said plural muscle vectors further includes an origin point defining a rigid connection of said muscle vector with an underlying structure corresponding to actual cranial tissue.

3. The method for animating facial motion of claim 1, wherein at least one of said plural muscle vectors further includes an insertion point defining a connection of said muscle vector with an overlying surface corresponding to actual skin.

4. The method for animating facial motion of claim 1, wherein at least one of said plural muscle vectors further includes interconnection points with other ones of said plural muscle vectors.

5. The method for animating facial motion of claim 1, further comprising defining facial marker locations for the actor's face corresponding to said plurality of vertices.

6. The method for animating facial motion of claim 5, further comprising generating a template having holes corresponding to said defined facial marker locations for use in marking said locations on the actor's face.

7. The method for animating facial motion of claim 1, receiving an input signal defining said actuation in addition to said motion capture data.

8. The method for animating facial motion of claim 7, wherein said input signal further comprises a user selection of at least one of said plural muscle vectors and a compression value to be applied to said selected one of said plural muscle vectors.

9. The method for animating facial motion of claim 7, wherein said input signal further comprises a user selection of pose comprised of plural ones of said plural muscle vectors and a compression value to be applied to said plural ones of said plural muscle vectors.

10. The method for animating facial motion of claim 1, further comprising calibrating said motion capture data with respect to a default data set.

11. The method for animating facial motion of claim 1, further comprising re-targeting said motion capture data for a different digital model.

12. The method for animating facial motion of claim 1, further comprising determining directional orientation of the actor's eyes from the motion capture data and animating eyes for said digital model consistent with said determined directional orientation.

13. A system for animating facial motion, comprising:
   an animation processor adapted to generate three-dimensional graphical images and having a user interface;
   a motion capture processor adapted to produce motion capture data reflecting physical movement of an actor's face; and
   a facial performance processing system operative with said animation processor and said motion capture processor to generate a three-dimensional digital model of an animated face and provide a virtual muscle structure for the digital model including plural muscle vectors each respectively defining a plurality of vertices along a surface of said digital model in a direction corresponding to that of actual facial muscles, said facial performance processing system being responsive to said motion capture data to produce selective actuation of at least one of said plural muscle vectors to thereby reposition corresponding ones of said plurality of vertices and re-generate said digital model in a manner that simulates motion of said digital model in correspondence with said physical movement of the actor's face.

14. The system of claim 13, wherein at least one of said plural muscle vectors further includes an origin point defining a rigid connection of said muscle vector with an underlying structure corresponding to actual cranial tissue.

15. The system of claim 13, wherein at least one of said plural muscle vectors further includes at least one insertion point defining a connection of said muscle vector with an overlying surface corresponding to actual skin.

16. The system of claim 13, wherein at least one of said plural muscle vectors further includes at least one interconnection point with other ones of said plural muscle vectors.

17. The system of claim 13, wherein said facial performance processing system is further operative to define facial marker locations corresponding to said plurality of vertices.

18. The system of claim 17, wherein said facial performance processing system is further operative to generate a template having holes corresponding to said defined facial marker locations for use in marking said locations onto the actor's face.

19. The system of claim 13, wherein said input further comprises a user selection of at least one of said plural muscle vectors and a compression value to be applied to said selected one of said plural muscle vectors.

20. The system of claim 13, wherein said input further comprises a user selection of a pose comprising a combination of plural ones of said plural muscle vectors and at least one associated compression value to be applied to said plural ones of said plural muscle vectors.

21. The system of claim 13, wherein said facial performance processing system is further operative to calibrate said motion capture data with respect to a default data set.

22. The system of claim 13, wherein said facial performance processing system is further operative to re-target said motion capture data for a different digital model.

23. The system of claim 13, wherein said facial performance processing system is further operative to determine directional orientation of the actor's eyes from the motion capture data and animate eyes for said digital model in accordance with said determined directional orientation.

* * * * *